United States Patent
Feekes, Jr.

(10) Patent No.: US 7,441,136 B2
(45) Date of Patent: Oct. 21, 2008

(54) SYSTEM FOR PREDICTIVE PROCESSOR COMPONENT SUSPENSION AND METHOD THEREOF

(75) Inventor: Dan Gerrit Feekes, Jr., Lafayette, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 393 days.

(21) Appl. No.: 11/098,321

(22) Filed: Apr. 4, 2005

(65) Prior Publication Data

US 2006/0225046 A1 Oct. 5, 2006

(51) Int. Cl.
*G06F 1/00* (2006.01)
*G06F 1/26* (2006.01)
*G06F 1/32* (2006.01)

(52) U.S. Cl. .................. 713/324; 713/300; 713/320

(58) Field of Classification Search .............. 713/300, 713/320, 324
See application file for complete search history.

(56) References Cited

U.S. PATENT DOCUMENTS

| | | | |
|---|---|---|---|
| 5,666,537 A | * | 9/1997 | Debnath et al. ............ 713/322 |
| 6,012,125 A | | 1/2000 | Tran |
| 6,816,977 B2 | * | 11/2004 | Brakmo et al. ............. 713/323 |
| 2003/0037221 A1 | * | 2/2003 | Gschwind et al. ............ 712/3 |
| 2004/0002823 A1 | * | 1/2004 | Aldridge et al. ............ 702/60 |
| 2005/0181840 A1 | * | 8/2005 | Banginwar et al. ......... 455/574 |
| 2006/0074497 A1 | * | 4/2006 | Pollin .......................... 700/14 |
| 2007/0074219 A1 | * | 3/2007 | Ginsberg .................... 718/102 |

FOREIGN PATENT DOCUMENTS

EP 1117031 A1 * 7/2001

* cited by examiner

*Primary Examiner*—Thomas Lee
*Assistant Examiner*—Jaweed A Abbaszadeh

(57) ABSTRACT

An instruction cycle is determined from instructions stored in a cache, where the instruction cycle represents the sequence of instructions predicted to be executed by the processing device that are resident in the cache. The duration of the instruction cycle is estimated and one or more components of the processing device that are not expected to be used during the instruction cycle may be suspended for a portion or all of the duration. The components may be suspended by, for example, clock gating or by isolating the components from one or more power domains.

21 Claims, 4 Drawing Sheets

400

RECEIVE A PLURALITY OF INSTRUCTIONS
402

↓

IDENTIFY ONE OR MORE COMPONENTS OF A PROCESSOR THAT ARE EXPECTED TO BE UNUSED DURING AN EXECUTION OF A SEQUENCE OF THE INSTRUCTIONS FROM THE PLURALITY OF INSTRUCTIONS
404

↓

SUSPEND AT LEAST ONE OF THE ONE OR MORE IDENTIFIED COMPONENTS DURING AN EXECUTION AT LEAST A PORTION OF THE SEQUENCE OF INSTRUCTIONS BY THE PROCESSOR
406

SYSTEM FOR PREDICTIVE PROCESSOR COMPONENT SUSPENSION AND METHOD THEREOF

FIELD OF THE DISCLOSURE

The present disclosure is related generally to power saving in processing devices more specifically to suspending specific components of processing devices.

BACKGROUND

Pipelined processing often provides improved performance due to the ability to process multiple instructions at various components of a pipeline simultaneously. Performance further may be enhanced using branch prediction techniques whereby a branch prediction unit of a processing device predicts whether a branch presented by an upcoming change of flow (COF) instruction is taken. If the branch is predicted to be taken, the instructions following the branch may be preloaded into the instruction cache of the processing device, and also may be executed in whole or in part before the COF instruction is resolved. However, in the event of a misprediction, the pipeline typically is flushed and any results of the execution of the instructions associated with the misprediction are discarded. Thus, misprediction often results in considerable power consumption by the processor as well as wasted processing cycles.

Regardless of the effectiveness of a processor's branch prediction, it will be appreciated that the fetching and execution of instructions by the pipelined processing device may not involve or require the use of one or more components of the processing device. To illustrate, the execution of an instruction representing an integer operation typically does not require the use of a floating point unit (FPU) of the processing device. The processing device therefore often unnecessarily consumes power while maintaining certain components in an enabled status even though an upcoming instruction stream does not require the use of the certain components. Accordingly, a system and method to reduce the power consumption of a processing device and reduce the penalty associated with mispredicted branches would be advantageous.

BRIEF DESCRIPTION OF THE DRAWINGS

The purpose and advantages of the present disclosure will be apparent to those of ordinary skill in the art from the following detailed description in conjunction with the appended drawings in which like reference characters are used to indicate like elements, and in which.

DETAILED DESCRIPTION OF THE DRAWINGS

FIGS. 1-5 illustrate exemplary systems and techniques for dynamically suspending processor components so as to reduce the power consumption of a processing device. In at least one embodiment, an instruction cycle is determined from the instructions stored in a cache, where the instruction cycle represents the sequence of instructions predicted to be executed by the processing device that are resident in the cache. The duration of the instruction cycle is estimated and one or more components of the processing device that are not expected to be used during the instruction cycle may be suspended for a portion or all of the duration. The components may be suspended by, for example, clock gating or by isolating the components from one or more power domains.

Figure 1:
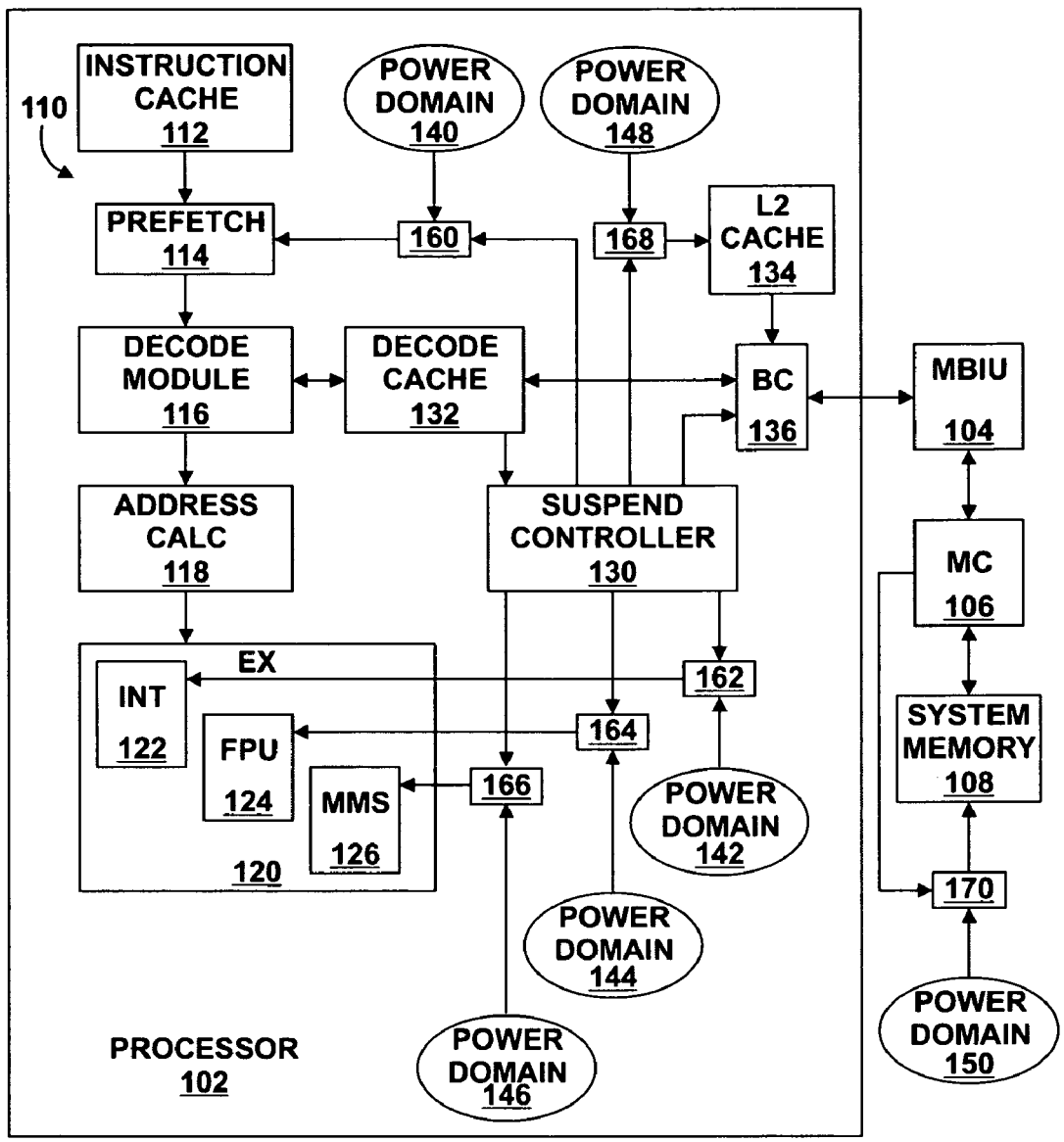
FIG. 1 is a block diagram illustrating an exemplary processing system in accordance with at least one embodiment of the present disclosure.

Referring now to FIG. 1, an exemplary processing system 100 is illustrated in accordance with at least one embodiment of the present disclosure. The processing system 100 includes a processing device, such as processor 102, coupled to one or more peripheral components, such as, for example, a master bus interface unit 104, a memory controller (MC) 106, and a system memory 108. The processor 102 includes an instruction pipeline 110 having, for example, an instruction cache 112, a prefetch module 114, a decode module 116, an address calculation module 118, and an execution module 120. The execution module 120 may include, for example, an integer unit 122, a floating point unit (FPU) 124, a multimedia extension (MMX) unit 126, and the like. The processor 102 further may include a suspend controller 130, a decode cache 132, a level two (L2) cache 134, and a bus controller (BC) 136 as an interface between the components of the processor 102 and the peripheral components.

Based on branch prediction information or other prefetch information, the prefetch module 114 fetches identified instructions from the instruction cache 112 or from system memory 108 and provides the instructions to the decode module 116. The decode module 116, in one embodiment, partially or fully decodes the prefetched instructions and stores the instructions in the decode cache 132 and/or the L2 cache 134. Instructions in the decode cache 132 and/or instructions directly fetched from the instruction cache 112 then may be provided to the address calculation module 118 and the execution module 120 for execution in accordance with the program flow.

As discussed in greater detail with reference to FIG. 2, the decode module 116, in one embodiment, determines certain program flow characteristics associated with an instruction provided by the prefetch module 114 and provides representations of these program flow characteristics to the decode cache 132 for storage with the corresponding decoded instruction. The program flow characteristics may include, but are not limited to, a change of flow characteristic (i.e., whether the instruction may result in a branch), an indication of those processor components expected to be used to execute the instruction or that are expected to be used as a result of the execution of the instruction, as well as branch prediction characteristics if the instruction is a COF instruction, such as whether the branch is predicted to be taken, the number of times the instruction is expected to be taken before the prediction is complemented, and a number of times the given COF instruction has been resolved correctly before the complement prediction is realized.

Based on the instructions in the decode cache 132 and the associated program flow characteristics, the suspend controller 130, in one embodiment, may estimate a duration before an instruction not resident in the decode cache 132 is expected to be requested. The suspend controller 130 may identify those components of the processor 102 that are expected to be unused during the estimated duration and then suspend one or more of the identified components for a portion or all of the duration so as to reduce the power consumed by the processor 102 during the duration. Similarly, the suspend controller 130 may identify one or more peripheral components expected to be unused during the duration and suspend one or more of these peripheral components for some or all of the duration. As discussed below, the additional power consumption involved in shutting down and restarting processor components or peripheral components may be considered when determining whether to suspend a particular component.

In at least one embodiment, the one or more processor components are suspended by isolating the one or more processor components from their corresponding power domains by shutting down the corresponding power domains. To illustrate, the prefetch module 114 may be associated with a power domain 140, the integer unit 122 may be associated with a power domain 142, the FPU 124 may be associated with a power domain 144, the MMX unit 126 may be associated with a power domain 146, the L2 cache 134 may be associated with a power domain 148, and the system memory 108 may be associated with a power domain 150. The suspend controller 130 therefore may disconnect one or more of the components 114, 122, 124, 126, 134 from the corresponding power domains 140-148 by, for example, providing an asserted suspend signal to one or more switch units 160-168 interposed between the components 114, 122, 124, 126, 134 and the power supply line(s) of the power domains 140-148. Likewise, a deasserted suspend signal may be supplied to reconnect a component to the corresponding power domain. To illustrate, in response to a determination that the MMX unit 126 is expected to be unused for a particular instruction cycle, the suspend controller 130 may provide an asserted suspend signal to the switch unit 166 to disconnect the MMX unit 126 from the power domain 146. As the instruction cycle comes to a conclusion, the suspend controller 130 may provide a deasserted suspend signal to the switch unit 166 to reconnect the MMX unit 126 to the power domain 146. Similarly, the suspend controller 130 may provide an asserted signal to the switch unit 170 via, for example, the BC 136, MBIU 104 and the MC 106 to disconnect the system memory 108 from the power domain 150 in response to a determination that the system memory 108 is expected to be unused. The switch units 160-170 may comprise, any of a variety of suitable switching mechanisms, such as, for example, a transistor.

Although FIG. 1 illustrates a one-to-one correspondence between power domains and processor components for ease of illustration, it will be appreciated that multiple components may be associated with one power domain and/or multiple power domains may be associated with one component. In those instances wherein it is expected that all of the components associated with a particular power domain will be unused during a particular instruction cycle, the components may be suspended by isolating the power domain from its power source. Alternately, processor components and peripheral components may be suspended using other techniques, such as clock gating, without departing from the spirit or the scope of the present disclosure.

Figure 2:
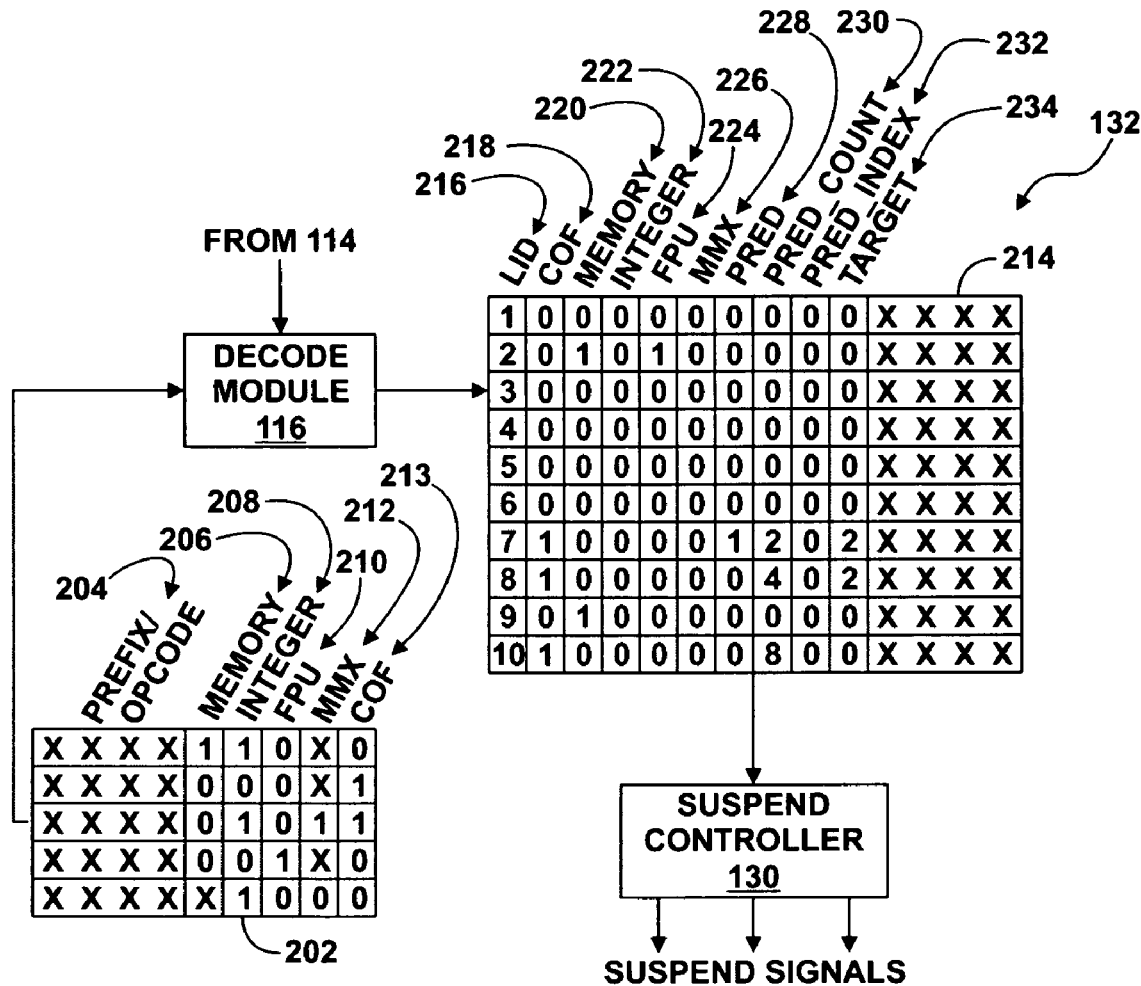
FIG. 2 is a block diagram illustrating an exemplary suspend controller of the exemplary processing system of FIG. 1 in accordance with at least one embodiment of the present disclosure.

Referring now to FIG. 2, an exemplary implementation of the decode module 116, decode cache 132 and suspend controller 130 is illustrated in accordance with at least one embodiment of the present disclosure. In one embodiment, the decode module 116 makes use of a program flow criteria table 202 to determine program flow criteria associated with instructions that the decode module 116 stores in the decode cache 132. In the illustrated example, the table 202 includes a plurality of entries for at least a subset of the instruction types compatible with the processor 102. Each entry may have a prefix/opcode field 204 to identify the particular instruction type and a one or more fields to indicate whether a corresponding processor or peripheral component is expected to be used during, or as a result of, the execution of an instruction having the corresponding instruction type. For example, the fields could include a memory field 206, an integer field 208, an FPU field 210, and an MMX field 212 to indicate if an instruction having a particular instruction type is expected to use system memory 108, integer unit 124, FPU 124, or MMX unit 126, respectively. In addition, each entry may include a COF field 213 to indicate whether the instruction type is a potential COF instruction.

Upon reciept of an instruction from the prefetch module 114, the decode module 116 decodes the instruction to the appropriate extent and uses an identifier, such as the instruction's opcode or prefix, to identify the corresponding instruction-type entry in the table 202. Using the values in the fields of the entry of the tabel 202, the decode module 116 populates an entry of the decode cache 132 with the at least partially decoced instruction (stored in field 214) and the appropriate program flow information. The program flow fields of the decode cache 132 may include: a linear instruction pointer (LIP) field 216 to provide an index; a COF field 218 to indicate whether the instruction is a COF instruction and fields 218-226 to indicate whether the instruction is expected to use the system memory 108, integer unit 124, FPU 124, or MMX unit 126, respectively. The entries of the decode cache 132 further may include: a predicted field 228 to indicate whether a COF instruction is predicted to be taken; a prediction count field 230 to indicate the number of times the COF instruction is predicted to be taken before the prediction is complemented; a prediction index field 232 to indicate the number of times the COF instruction has been resolved correctly by the execution module 120 before the compliment prediction is realized; and a target field 234 to indicate the target of a COF instruction. The decode module 116 may determine the appropriate value for each of these fields using information from the table 202 as well as branch prediction information provided by the branch prediction logic associated with, for example, the prefetch module 114.

The suspend controller 130, in one embodiment, analyzes the decode cache 132 to identify one or more instruction cycles, each of which represents a sequence of instructions, resident in the decode cache 132, that is expected to be executed in turn by the execution module 120, where the termination of the instruction cycle includes the request for an instruction not resident in the decode cache 132. Note that the sequence of instructions may include multiple occurrences of one or more instructions should the decode cache 132 include instructions that form a loop within the decode cache 132. To illustrate using the example of FIG. 2, an exemplary instruction cycle starting at LIP 1 would include: {LIP 1, 2, 3, 4, 5, 6, 7, 2, 3, 4, 5, 6, 7, 2, 3, 4, 5, 6, 7, 8, 9, 10}. It will be appreciated that the sequence of instructions at LIP 2-7 is repeated three times due to: the value '1' in the COF field 218 and the prediction field 228 which indicate that the instruction at LIP 7 is a COF instruction and is predicted to be taken; the value '2' in the target field 234 which indicates that the instruction will branch to the instruction at LIP 2; and the value '2' in the prediction count field 230 indicating that the branch to the instruction at LIP 2 will repeat twice.

After identifying the expected instruction cycle(s), the suspend controller may determine the duration of processing time expected to be taken if the processor 102 does actually execute instructions as predicted in an instruction cycle. In one embodiment, the duration is determined on the basis of clock cycles. The suspend controller 130 may arrive at the total number of clock cycles for the instruction cycle using, for example, an average number of clock cycles per instruction. To illustrate, for a predetermined average of, for example, 2.4 clock cycles per instruction, the suspend module 130 could determine that an instruction cycle having a sequence of thirty instructions would take 72 clock cycles (i.e., 2.4 clock cycles/instruction×30 instructions). Alternatively, the suspend controller 130 could determine the number of clock cycles used by the processor 102 to execute each of the instructions of the instruction cycle based on their instruction types to arrive at the total number of clock cycles for the instruction cycle.

The suspend controller 130 may identify those components that are expected to be unused during the execution of the instruction cycle using, for example, the fields 220-226 of the entries of the decode cache 132 corresponding to the instructions in the instruction cycle. To illustrate, the instruction at LIP 2 has a value of '1' in fields 220 and 224, indicating that the system memory 108 and the FPU 124 is used to execute the instruction, whereas none of the instructions in the exemplary instruction cycle provided above have a value of '1' in the fields 222 or 226, indicating that neither the integer unit 122 nor the MMX unit 126 are expected to be used during the execution of the instructions of the exemplary instruction cycle. Based on the expected duration of the instruction cycle and the components expected to be unused during the execution of the instruction cycle, the suspend controller 130 may suspend the appropriate processor components and peripheral components by providing, for example, asserted suspend signals to the appropriate switching units (FIG. 1).

Figure 3:
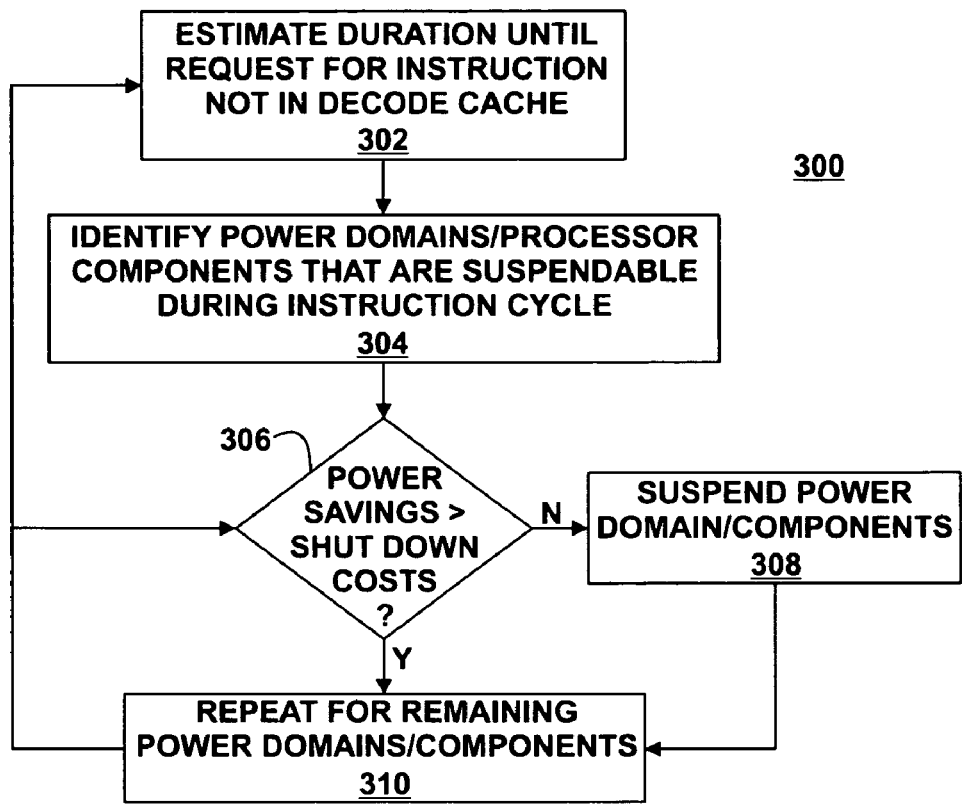
FIGS. 3-5 are flow diagrams illustrating exemplary methods for dynamically suspending components of a processing device in accordance with at least one embodiment of the present disclosure.

Referring now to FIG. 3, an exemplary method 300 to identify and suspend processor and peripheral components is illustrated in accordance with at least one embodiment of the present disclosure. The method 300 initates at step 302, wherein the duration of an identified instruction cycle in the decode cache 132 is determined. As noted above, the duration may be represented by a number of clock cycles expected to be used during an execution of the sequence of instructions of the instruction cycle.

At step 304, the suspend controller 130 identifies one or more components that may be suspended for part or all of the predicted duration. However, it will be appreciated that there may be power and clock cycles wasted in shutting down and then restarting certain components. For example, certain components may require initialization upon start up that may requires tens, hundreds or thousands of clock cycles and more than neglible power. Accordingly, at step 306 the suspend controller 130 makes a determination of whether there is a power savings advantage to suspending a particular component in view of the power and time costs of suspending the particular component. This evaluation may take into consideration the power saved while the component is suspended and the power consumed to shut down and then restart the component. For example, if an instruction cycle is predicted to be 100 clock cycles long and a particular component can be shut down for 90 of those cycles (assuming a 10 cycle reinitialization period) at a power savings of 0.001 milliwatt (mW) per cycle, or a total power savings of 0.1 mW for the instruction cycle, the suspend controller 130 may elect to forgo suspending the component if the shut down power cost is close to or more than 0.1 mW.

In another embodiment, the relative value of suspending a component may be determined based a comparison of the expected duration with one or more thresholds. For example, if the duration is less than a certain threshold (e.g., 100 clock cycles), the suspend controller may elect to forgo suspending the component. Alternatively, the type of suspend operation utilzed by the suspend controller 130 may be determined based on a comparison of the predicted comparison to one or more thresholds. To illustrate, if the duration is less than a first threshold (e.g., 50 clock cycles), no suspend operation is perfomed. If the duration is greater than the first threshold but less than a second theshold (e.g., 200 clock cycles), a clock-gating suspend operation may be performed. If the duration is greater than the second threshold, a suspend operation that isolates the component from its power domain may be performed. By having multiple tiers of suspend operations, the power savings/shutdown cost balance may be tailored to the particular instruction cycle based on its expected duration. It will be appreciated that the thresholds may be set relative to the specific component of the processing device to be suspended. For example, if a simple component, such as a multiplexer or adder is to be suspended, the clock-gating threshold may be set relatively low (e.g., a couple of clock cycles), whereas suspending a more complex component, such as a FPU, is to be suspended, the clock-gating threshold may be set relatively high (e.g., hundreds or thousands of clock cycles).

If it is determined to be advantageous to suspend the component for at least a portion of the duration, the suspend controller 130 suspends the component for the identified portion of the duration at step 308. At the execution of the identified portion of the duration concludes, the suspend controller 130 reinitializes and/or restarts the component unless the component is identified as being unecessary for the next instruction cycle, in which case the suspend controller may maintain the component in suspended state. If multiple components are identified as suspendable, the suspend controller 130 may repeat steps 306 and 308 for each identified component at step 310.

Figure 4:
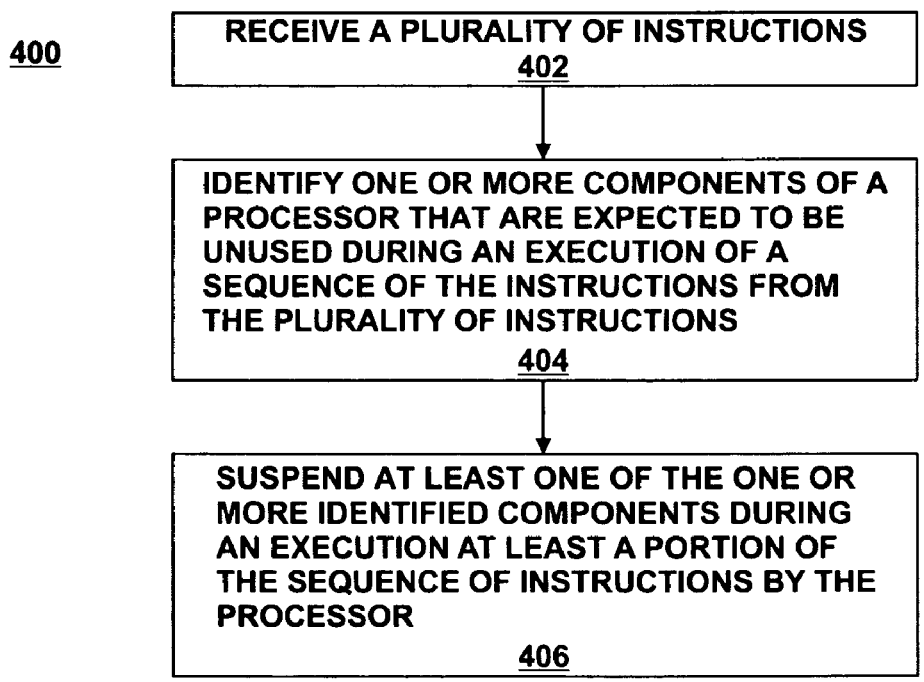

Referring now to FIG. 4, an exemplary method 400 is illustrated. Method 400 initates at step 402 wherein a plurality of instructions are received. One or more components of a processor that are expected to be unused during an execution of a sequence of the instructions from the plurality of instructions are identified at step 404. At step 406, one or more of the identified components are suspending during an execution of at least a portion of the sequence of instructions by the processor.

Figure 5:
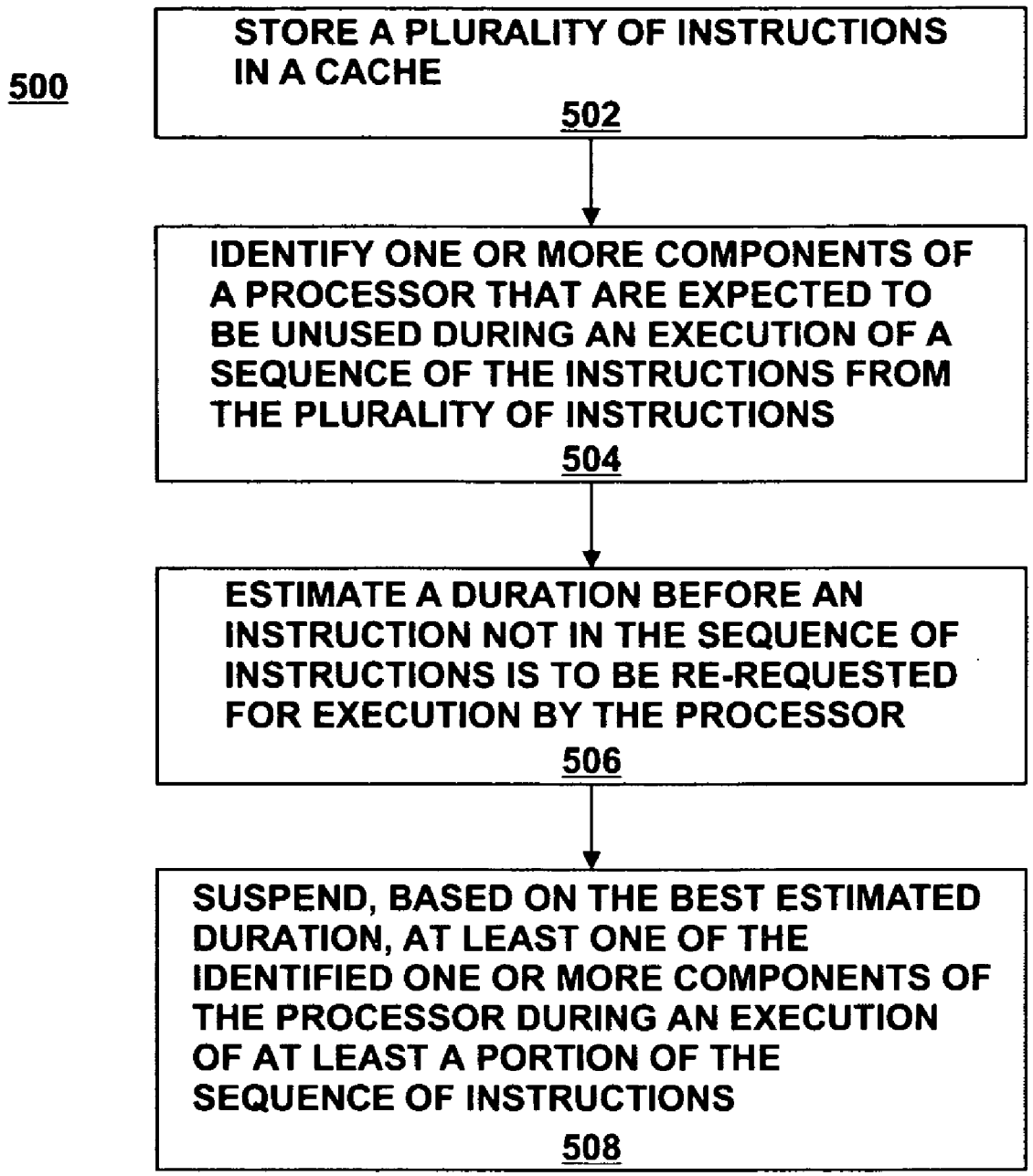

Referring now to FIG. 5, an exemplary method 500 is illustrated. Method 500 initates at step 502 wherein a plurality of decoded instructions are stored in a cache. One or more components of a processor that are expected to be unused during an execution of a sequence of the instructions from the plurality of instructions are identified at step 504. At step 506, a duration before an instruction not in the sequence of instructions is requested for execution by the processor is estimated. At step 508, at least one of the one or more identified one or more components of the processor is suspended, based on the estimated duration, during an execution of at least a portion of the sequence of instructions.

The above-disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    receiving a plurality of instructions;
    identifying one or more components of a processor that are expected to be unused during an execution of a sequence of instructions from the plurality of instructions; and selectively suspending at least one of the one or more identified components of the processor during an execution of at least a portion of the sequence of instructions by the processor based on an amount of power expected to be consumed to reenable the at least one component.

2. The method of claim 1, wherein suspending the at least one component includes isolating the at least one component from one or more power domains.

3. The method of claim 1, wherein suspending the at least one component includes clock gating the at least one component.

4. The method of claim 1, wherein selectively suspending the at least one component comprises:
 suspending the at least one component in response to determining an amount of power expected to be consumed by maintaining the at least one component in an enabled state for the execution of at least a portion of the sequence of instructions is not less than the amount of power expected to be consumed to reenable the at least one component; and
 maintaining the at least one component in an enabled state in response to determining the amount of power expected to be consumed by maintaining the at least one component in an enabled state for the execution of at least a portion of the sequence of instructions is not greater than the amount of power expected to be consumed to reenable the at least one component.

5. A method comprising:
 storing a plurality of instructions in a cache of a processor;
 identifying one or more components of the processor expected to be unused during an execution of a sequence of instructions of the plurality of instructions by the processor;
 estimating, at the processor, a duration before an instruction not in the sequence of instructions is to be requested for execution by the processor; and
 suspending, based on the duration, at least one of the one or more identified components of the processor during an execution of at least a portion of the sequence of instructions by the processor.

6. The method of claim 5, wherein the at least one component is suspended when a power consumption associated with suspending and reenabling the at least one component is less than a power consumption associated with maintaining the at least one component in an enabled state for the duration.

7. The method of claim 6, wherein the at least one component is suspended by clock gating the at least one component when the duration is greater than a first threshold.

8. The method of claim 7, wherein suspending the at least one component includes isolating the at least one component from one or more power domains when the duration is greater than a second threshold, and wherein the second threshold is greater than the first threshold.

9. The method of claim 6, wherein suspending the at least one component includes isolating the at least one component from one or more power domains when the number of cycles is greater than a first threshold.

10. A processor comprising:
 a plurality of components;
 storage means for storing a plurality of instructions;
 means for identifying one or more components of the plurality of components that are expected to be unused during an execution of a sequence of instructions of the plurality of instructions by the processor; and
 means for selectively suspending at least one of the one or more identified components during an execution of at least a portion of the sequence of instructions by the processor based on an amount of power expected to be consumed to reenable the at least one component.

11. The processor of claim 10, wherein the means for suspending the at least one component includes means for clock gating the at least one component.

12. The processor of claim 10, wherein the means for suspending the at least one component includes means for isolating the at least one component from one or more power domains.

13. The processor of claim 10, further comprising means for determining a duration before an instruction not included in the sequence of instructions is to be requested for execution by the processor.

14. The processor of claim 13, wherein the means for selectively suspending the at least one component includes means for clock gating the at least one component when the duration is greater than a first threshold.

15. The processor of claim 13, wherein the means for selectively suspending the at least one component includes means for isolating the at least one component from one or more power domains when the duration is greater than a second threshold, where the second threshold is greater than the first threshold.

16. The processor of claim 13, wherein the means for selectively suspending the at least one component includes means for isolating the at least one component from one or more power domains when the duration is greater than a first threshold.

17. The processor of claim 10, wherein the means for selectively suspending the at least one component comprises:
 means for suspending the at least one component in response to determining an amount of power expected to be consumed by maintaining the at least one component in an enabled state for the execution of at least a portion of the sequence of instructions is not less than the amount of power expected to be consumed to reenable the at least one component; and
 means for maintaining the at least one component in an enabled state in response to determining the amount of power expected to be consumed by maintaining the at least one component in an enabled state for the execution of at least a portion of the sequence of instructions is not greater than the amount of power expected to be consumed to reenable the at least one component.

18. A processor comprising:
 a plurality of components;
 a decode cache to store a plurality of instructions to be executed by the processor; and
 a controller to:
  identify one or more of the plurality of components expected to be unused during an execution of a sequence of instructions of the plurality of instructions by the processor;
  determine a duration before an instruction not included in the sequence of instructions is to be requested for execution by the processor; and
  initiate a suspension of at least one of the one or more components for at least a portion of the execution of the sequence of instructions by the processor based on the duration.

19. The processor of claim 18, wherein the controller initiates the suspension of the at least one component by initiating a clock gating of the one or more components.

20. The processor of claim 18, wherein the controller initiates the suspension of the at least one component by initiating an isolation of the one or more components from one or more power domains.

21. The processor of claim 18, wherein the controller initiates the suspension of the one or more components by initiating a clock gating of the one or more components when the duration is greater than a first threshold, and wherein the controller initiates the suspension of the one or more components by initiating an isolation of the one or more components from one or more power domains when the duration is greater than a second threshold, where the second threshold is greater than the first threshold.

* * * * *